(12) United States Patent
Panikkar (10) Patent No.: US 12,299,441 B2
(45) Date of Patent: May 13, 2025

(54) IDENTIFYING APPLICATION RELATIONSHIPS USING NATURAL LANGUAGE PROCESSING TECHNIQUES

(71) Applicant: Dell Products L.P., Round Rock, TX (US)

(72) Inventor: Shibi Panikkar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 60 days.

(21) Appl. No.: 18/110,192

(22) Filed: Feb. 15, 2023

(65) Prior Publication Data
US 2024/0272902 A1    Aug. 15, 2024

(51) Int. Cl.
*G06F 8/77*      (2018.01)

(52) U.S. Cl.
CPC ..................... *G06F 8/77* (2013.01)

(58) Field of Classification Search
CPC ....................................................... G06F 8/77
See application file for complete search history.

(56) References Cited

U.S. PATENT DOCUMENTS

| | | | | |
|---|---|---|---|---|
| 10,922,493 B1 * | 2/2021 | Das | ......................... | G06F 40/30 |
| 2013/0318104 A1 * | 11/2013 | Nair | ....................... | G06Q 10/04 |
| | | | | 707/750 |
| 2019/0327154 A1 * | 10/2019 | Sahoo | ................... | H04L 43/045 |

FOREIGN PATENT DOCUMENTS

| | | | | | |
|---|---|---|---|---|---|
| CN | 107133296 | A | * | 9/2017 | ......... G06F 16/9535 |
| CN | 108959433 | A | * | 12/2018 | ............... G06F 8/75 |

OTHER PUBLICATIONS

Wikipedia contributors, "Software project management", Wikipedia, The Free Encyclopedia, available at: https://en.wikipedia.org/w/index.php?title=Software_project_management&oldid=1135442574 (accessed Feb. 15, 2023), last updated Jan. 24, 2023.
Wikipedia contributors, "BERT (language model)", Wikipedia, The Free Encyclopedia, available at: https://en.wikipedia.org/w/index.php?title=BERT_(language_model)&oldid=1138197095 (accessed Feb. 15, 2023), last updated Feb. 8, 2023.
Rehkopf, Max, "Agile epics: definition, examples, and templates", Atlassian, available at: https://www.atlassian.com/agile/project-management/epics (accessed Feb. 15, 2023).

* cited by examiner

*Primary Examiner* — Phillip H Nguyen
(74) *Attorney, Agent, or Firm* — Ryan, Mason & Lewis, LLP (57) ABSTRACT

Methods, apparatus, and processor-readable storage media for identifying application relationships using natural language processing techniques are provided herein. An example method includes processing an input related to a software project to derive a set of keywords and a set of intents; identifying a first application, from among a plurality of applications, related to the input based on a comparison of subsets of the keywords to keywords that are mapped to at least some of the plurality of applications in a first knowledge base; identifying a second application from among the plurality of applications related to the first application for at least a portion of the intents, wherein the second application is identified using a second knowledge base that maps the second application to the first application and at least one intent from the set of intents; and controlling initiation of an automated action based on the identified second application.

20 Claims, 7 Drawing Sheets

| SOURCE APPLICATION | INTERLOCKING APPLICATION | INTENT | DESCRIPTION |
| --- | --- | --- | --- |
| APPLICATION 1 | APPLICATION 2, APPLICATION 6, APPLICATION 7 | INTENT 1 | DESCRIPTION 1 |
| APPLICATION 1 | APPLICATION 3 | INTENT 2 | DESCRIPTION 2 |
| APPLICATION 4 | APPLICATION 5 | INTENT 3, INTENT 4 | DESCRIPTION 3 |
| APPLICATION 5 | APPLICATION 6 | INTENT 5 | DESCRIPTION 4 |

IDENTIFYING APPLICATION RELATIONSHIPS USING NATURAL LANGUAGE PROCESSING TECHNIQUES

FIELD

The field relates generally to information processing systems, and more particularly to software development techniques in such systems.

BACKGROUND

Organizations often rely on a large number of software applications that work together to perform various tasks or functions. When an organization wants to add a new feature or change an existing feature, a project manager generally needs to identify which software applications need to be updated and/or tested to accommodate the new feature and/or changed feature. This can often be difficult and time-consuming, particularly if the organization has a large number of applications and/or a large number of developer groups working on such applications.

SUMMARY

Illustrative embodiments of the disclosure provide techniques for identifying application relationships using natural language processing (NLP) techniques. An exemplary computer-implemented method includes processing a natural language input related to a software project to derive a set of keywords and a set of intents; identifying at least one first application from among a plurality of applications related to the natural language input, wherein the at least one first application is identified based on a comparison of one or more subsets of the set of keywords to keywords that are mapped to at least a portion of the plurality of applications in a first knowledge base, wherein the mapping is based at least in part on one or more of the intents from the set of intents; identifying at least one second application from among the plurality of applications related to the at least one first application for at least a portion of the derived set of intents, wherein the at least one second application is identified using a second knowledge base that maps the at least one second application to the at least one first application and at least one intent from the set of intents; and controlling initiation of one or more automated actions based at least in part on the identified at least one second application.

Illustrative embodiments can provide significant advantages relative to conventional software tools. For example, technical problems associated with identifying applications affected by development work associated with, for example, new features and/or new requests are mitigated in one or more embodiments by applying NLP techniques to one or more software summaries (e.g., a linguistic description of the new features and/or changed features) corresponding to the development work to identify applications impacted by the development work. In some embodiments, one or more automated actions can be performed related to updating and/or testing the impacted applications, for example.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

As noted above, organizations, especially large organizations, often have numerous software applications to handle distinct functions. For an organization that uses an agile method of development, for example, a project manager can create a software summary (often referred to as an "epic") that sets forth a high-level description of features and/or requests that need to be performed. The term "software summary" as used herein is intended to be broadly construed so as to encompass information describing a body of work (e.g., a software project) that needs to be performed. It is to be appreciated that the term "software project" in this context and elsewhere herein is intended to be broadly construed so as to encompass, for example, activities and/or procedures related to producing new software (e.g., new computer code) and/or enhancing or modifying existing software. Such activities and/or procedures, for example, can relate to one or more of planning, scheduling, allocating resources, developing the software, testing the software, deploying the software, delivering the software, and/or maintaining the software.

Generally, a given software summary can be broken into a number of smaller tasks (also referred to herein as "stories") related to one or more requirements and/or one or more feature requests.

When a software summary is created, the project manager works with different developer groups to determine how the project should be completed. Project managers often do not have the level of insight that is needed to identify the applications that need to be updated and/or tested to complete the epic and often rely on one or more subject matter experts (SMEs) to obtain this information.

By way of example, consider a project manager for a given organization that creates the following software summary: "As a customer, I need a consolidated invoice for my subscriptions sent to an administrator by email." In such an example, the project manager typically needs to identify which application of the organization generates "invoices," and then needs to set up a meeting with a developer or group of developers that work on that application to identify the changes that are needed as a result of the software summary. The project manager may learn that the application is dependent on one or more other applications (e.g., the application receives a feed from an order management application). The project manager would then potentially need to gather further information from other developers and/or groups of developers regarding the dependent application. The process of identifying such applications often takes days or even weeks to complete, which can cause significant delays in the development process.

Figure 1:
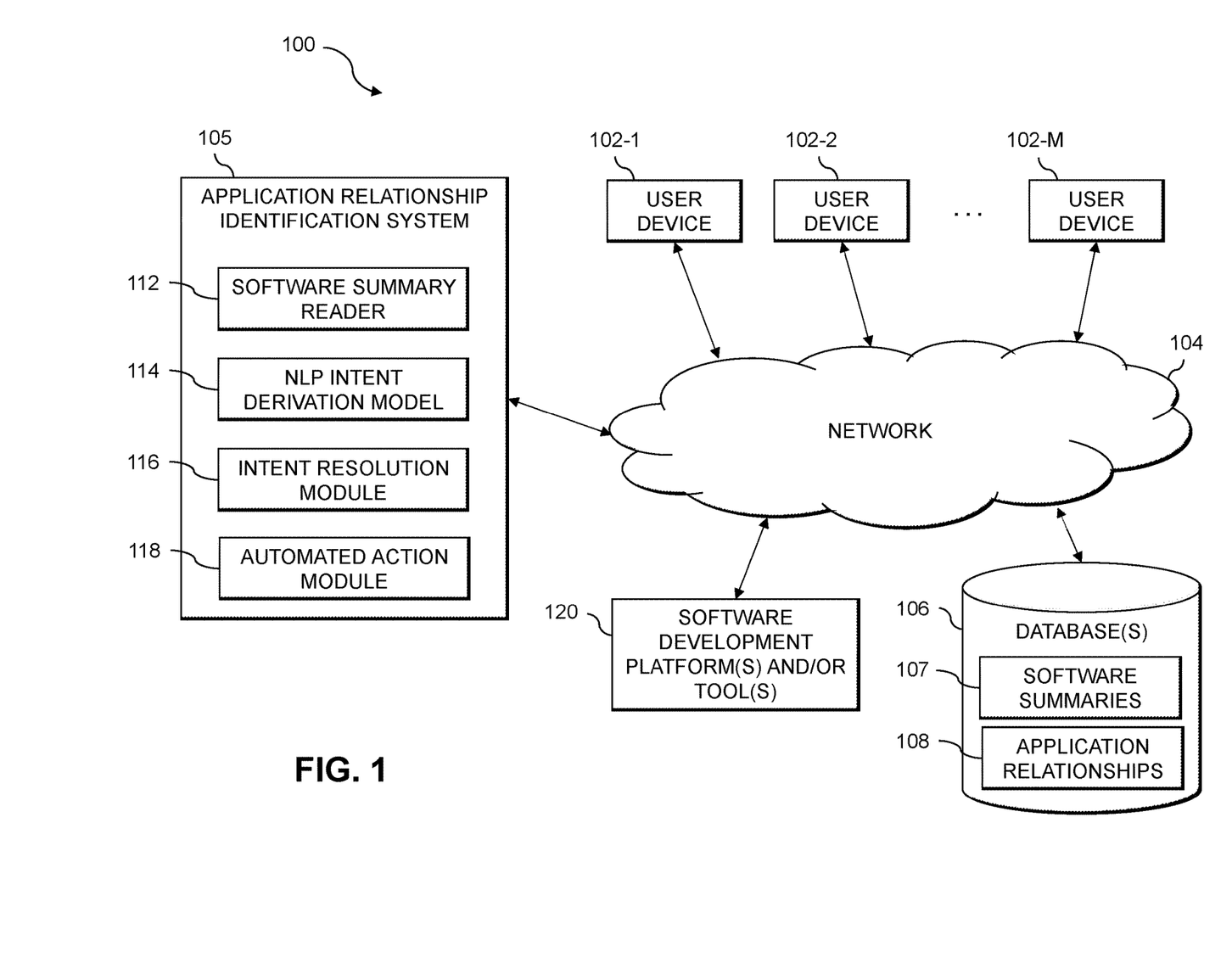
FIG. 1 shows an information processing system configured for identifying application relationships using NLP techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is an application relationship identification system 105 and one or more software development platforms and/or tool(s) 120.

The user devices 102 may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

The software development platforms and/or tool(s) 120 can include functionality, for example, for monitoring and/or managing workflows related to software development, such as one or more issue tracking tools (e.g., Jira™) and/or other types of software management tools (e.g., Team Foundation Server (TFS)). The software development platforms and/or tool(s) 120, in some embodiments, can include functionality for enabling users associated with one or more of the user devices 102 to enter software summaries related to a software development project. In the FIG. 1 example, the software development platforms and/or tool(s) 120 are shown separate from the application relationship identification system 105 and the user devices 102. It is to be appreciated, however, that in other embodiments the one or more of the software development platforms and/or tool(s) 120, or portions thereof, can be implemented by the application relationship identification system 105 and/or the user devices 102.

Additionally, the application relationship identification system 105 and/or the software development platforms and/or tool(s) 120 can have at least one associated database 106 configured to store data pertaining to, for example, one or more software summaries 107 and/or one or more application relationships 108. In some embodiments, the data pertaining to the one or more software summaries 107 can describe or define one or more new features, one or more application requests, and/or one or more new applications, possibly in a natural language format. Also, the data pertaining to the one or more applications relationships 108 can include a keyword application knowledge base and an intent interlock knowledge base related to one or more of the software summaries 107, as described in more detail elsewhere herein.

An example database 106, such as depicted in the present embodiment, can be implemented using one or more storage systems associated with the application relationship identification system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the application relationship identification system 105 are one or more input-output devices, which illustratively comprise keyboards, displays or other types of input-output devices in any combination. Such input-output devices can be used, for example, to support one or more user interfaces to the application relationship identification system 105, as well as to support communication between application relationship identification system 105 and other related systems and devices not explicitly shown.

Additionally, the application relationship identification system 105 in the FIG. 1 embodiment is assumed to be implemented using at least one processing device. Each such processing device generally comprises at least one processor and an associated memory, and implements one or more functional modules for controlling certain features of the application relationship identification system 105.

More particularly, the application relationship identification system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the application relationship identification system 105 to communicate over the network 104 with the user devices 102 and/or the software development platforms and/or tool(s) 120, and illustratively comprises one or more conventional transceivers.

The application relationship identification system 105 further comprises a software summary reader 112, an NLP intent derivation model 114, an intent resolution module 116, and an automated action module 118.

Generally, the software summary reader 112 processes and derives keywords for one or more of the software summaries 107. For example, the software summary reader 112 can apply one or more NLP algorithms to extract one or more relevant words from a software summary. The software summary reader 112 also maps the keywords to one or more applications based on the application relationships 108 (e.g., using the keyword application knowledge base).

The NLP intent derivation model 114, in some embodiments, processes the software summary using one or more NLP intent derivation techniques to determine one or more intents.

Generally, an NLP intent derivation process can use one or more machine learning and/or NLP techniques to associate natural language data (e.g., text data) to an intent. In some embodiments, the NLP intent derivation process can be implemented using a transformer-based model (e.g., a Bidirectional Encoder Representations from Transformers (BERT) model). In general, a BERT model uses an attention mechanism (referred to as a transformer) that learns contextual relations between words and/or sub-words in text. For example, a BERT model may process representations of words (e.g., word vectors) through a sequence of transformer blocks. The outputs of the last block in the BERT model undergo further processing based on the task being performed. As an example, if an NLP derivation process is provided the following text: "As a customer I need a consolidated invoice for my subscriptions sent to an administrator by email," then the NLP derivation process can be trained such that the following intents are output: "change in invoice," "change in subscription invoice," and "change in email."

The intent resolution module 116 uses the derived intents to identify different types of interlocking applications. The term "interlocking application" as used in this context and elsewhere herein is intended to be broadly construed so as to encompass, for example, applications that are potentially impacted by changes related to a software summary. In some embodiments, the intent resolution module 116 can identify different types of interlocking applications (e.g., active interlocking applications, passive interlocking applications, and test-only interlocking applications), as explained in more detail elsewhere herein.

The automated action module 118 can apply one or more automated actions in response to identifying one or more interlocking applications. The automated actions can include, for example, providing information (e.g., to one or more of the user devices 102) related to the interlocking applications. The information, in some embodiments, can include descriptions explaining the relationships between the interlocking applications and/or information identifying one or more developers or developer groups associated with each of the interlocking applications. The automated actions can alternatively or additionally include automatically creating and/or assigning a ticket in an issue tracking system to one or more users associated with the impacted applications. For example, the ticket can flag one or more software tests or portions of software code that may need to be updated and/or tested.

It is to be appreciated that this particular arrangement of elements 112, 114, 116, and 118 illustrated in the application relationship identification system 105 of the FIG. 1 embodiment is presented by way of example only, and alternative arrangements can be used in other embodiments. For example, the functionality associated with the elements 112, 114, 116, and 118 in other embodiments can be combined into a single element, or separated across a larger number of elements. As another example, multiple distinct processors can be used to implement different ones of the elements 112, 114, 116, and 118 or portions thereof.

At least portions of elements 112, 114, 116, and 118 may be implemented at least in part in the form of software that is stored in memory and executed by a processor.

It is to be understood that the particular set of elements shown in FIG. 1 for application relationship identification system 105 involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the application relationship identification system 105 and database(s) 106 can be on and/or part of the same processing platform.

An exemplary process utilizing elements 112, 114, 116, and 118 of an example application relationship identification system 105 in computer network 100 will be described in more detail with reference to, for example, the flow diagram of FIG. 5.

Figure 2:
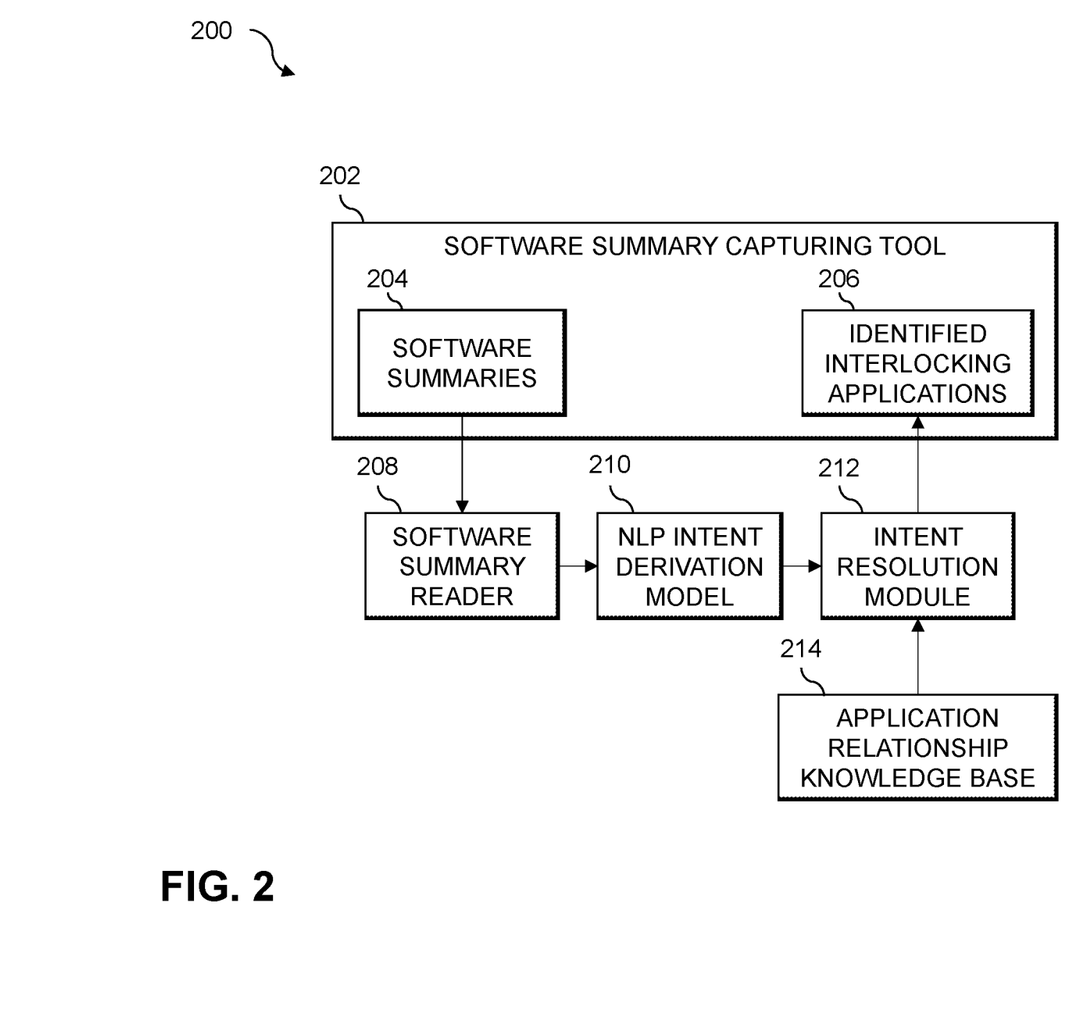
FIG. 2 shows a system architecture for identifying application relationships in an illustrative embodiment.

FIG. 2 shows a system architecture 200 for identifying application relationships in an illustrative embodiment. The system architecture 200 includes a software summary capturing tool 202 (e.g., corresponding to one or more of the software development platforms and/or tool(s)) 120), a software summary reader 208, an NLP intent derivation model 210, an intent resolution module 212, and an application relationship knowledge base 214.

The software summary capturing tool 202 can include functionality for users to create an item (e.g., a record or ticket) corresponding to one or more software summaries 204. Each of the software summaries 204 can correspond to one or more new features, one or more application requests, and/or one or more new applications, for example. Creating a record in the software summary capturing tool 202 can include entering a given software summary into a corresponding field.

The application relationship knowledge base 214 can include a keyword application knowledge base and an intent interlock knowledge base. The keyword application knowledge base is initially populated with mappings between keywords and/or combinations of keywords and one or more applications based on a set of intents.

Figure 3:
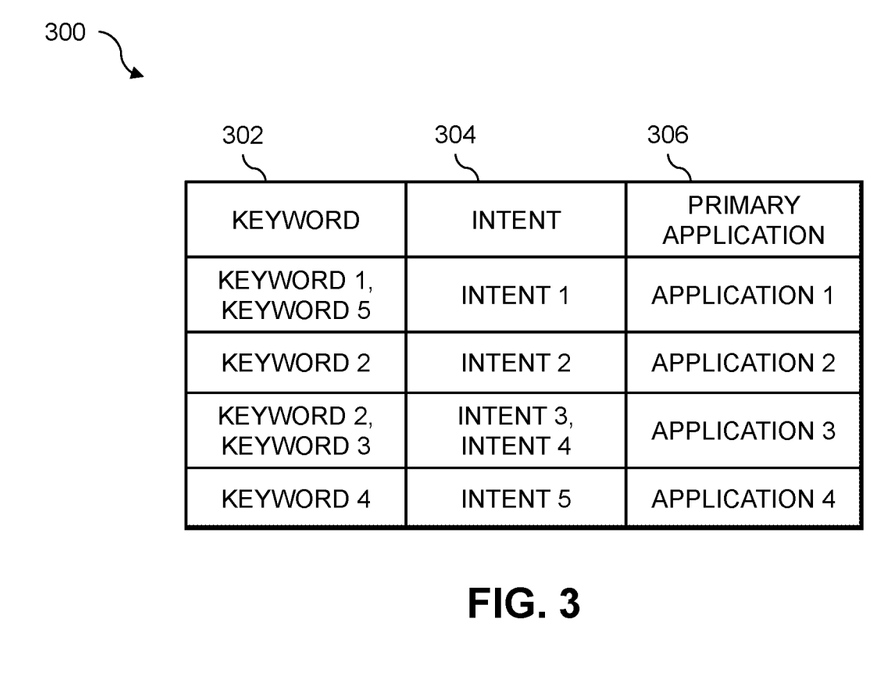
FIG. 3 shows an example of a keyword application knowledge base in an illustrative embodiment.

Referring also to FIG. 3, this figure shows an example of a keyword application knowledge base 300 in an illustrative embodiment. The keyword application knowledge base 300 includes a keyword field 302, an intent field 304, and a primary application field 306. In this example, the first record of the keyword application knowledge base 300 maps keyword 1 to application 1 if intent associated with the keywords is intent 1. It is noted that multiple keywords and/or multiple intents can be specified for a given primary application (e.g., in the third record of the keyword application knowledge base 300, keyword 2 and keyword 3 are mapped to application 3 based on intent 3 and intent 4). It is to be appreciated that different records in the keyword application knowledge base can include the same keyword. For example, in the keyword application knowledge base 300, the second and third records includes keyword 2.

Figure 4:
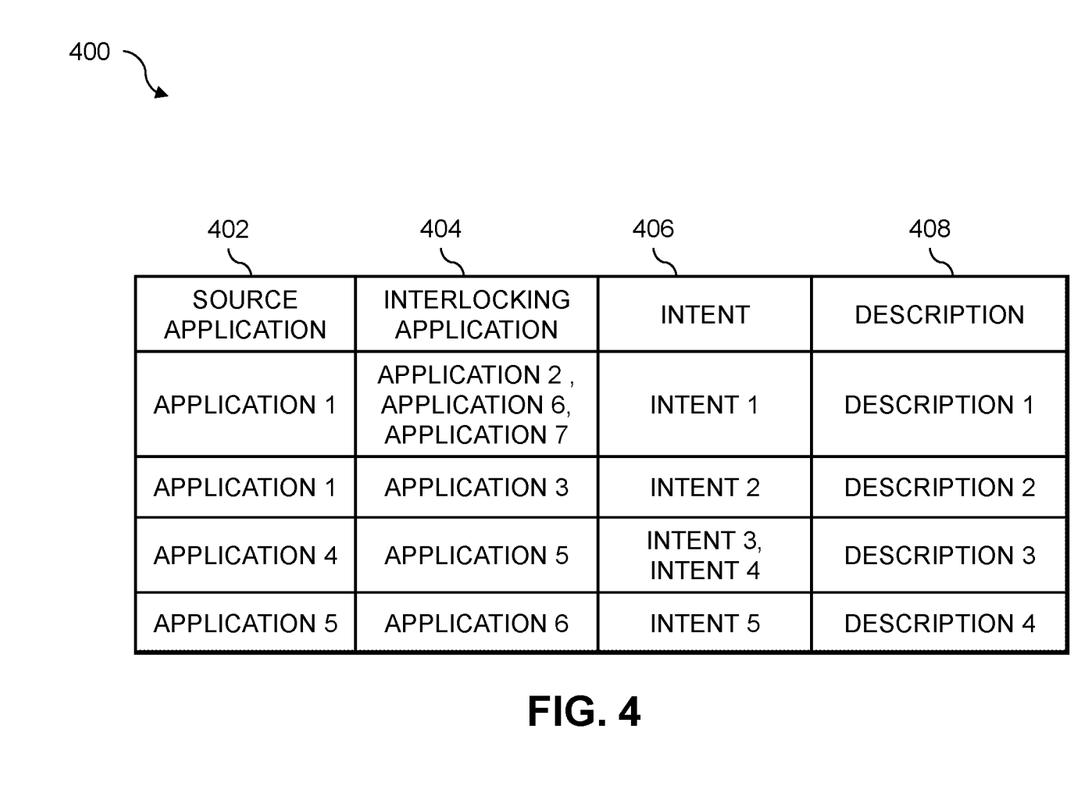
FIG. 4 shows an example of an intent interlock knowledge base in an illustrative embodiment.

Also, the intent interlock knowledge base can include information for mapping intents that are derived from the software summary to one or more interlocking applications, and possibly one or more description explaining the respective mappings. FIG. 4 shows an example of an intent interlock knowledge base 400 in an illustrative embodiment. The intent interlock knowledge base 400 includes a source application field 402, an interlocking application field 404, an intent field 406, and a description field 408. By way of example, if application 1 in source application field 402 is an order processing application, application 2 is a customer communication engine, and the intent 1 is "change in email," then description 1 can include the following explanation: "Order processing application uses customer communication engine to send emails." Accordingly, the intent interlock knowledge base 400 can be used to identify whether a given source application is mapped to one or more interlocking applications based on one or more derived intents, and possibly a reason for that mapping. The process for identifying applications can be performed by the intent resolution module 212, as explained in more detail below.

The application relationship knowledge base 214 can be continuously updated, in at least some embodiments, as the system (e.g., application relationship identification system 105) is used, as explained in more detail elsewhere herein.

In response to detecting a given one of the software summaries 204 being entered, the software summary reader 208 can read and derive the keywords corresponding to that software summary. In some examples, the keywords can be extracted by parsing the software summary into a set of tokens, and comparing the set of tokens to a set of words curated for a set of applications (e.g., applications currently used, developed, and/or maintained by a given organization). In some embodiments, the keywords can correspond to nouns in the software summary. Thus, at least one embodiment can additionally or alternatively include configuring one or more regular expressions, for example, to identify capitalized words and/or words following one or more articles (e.g., a, an, and the). It is to be appreciated that other techniques for extracting keywords are also possible, including using one or more NLP algorithms, such as applying a constituency parser to identify certain words (e.g., nouns) that are present in the software summary. Generally, a constituency parsing algorithm divides a given input text (e.g., a sentence) into a set of smaller parts or phrases (named constituents) that belong to a specific category in the grammar. For example, constituents can be generated in the form of a constituency parse tree, and a set of grammar rules can be applied to the constituency parse tree to label each word in the input text with a respective part-of-speech label. Accordingly, words that are labeled as nouns can be extracted as keywords.

As an example, the software summary reader 208 can analyze the following software summary: "As a customer I need a consolidated invoice for my subscriptions sent to an administrator by email," and extract the following nouns as keywords: customer, invoice, subscriptions, administrator, and email. The keywords can then be compared to the keyword application knowledge base to determine if there are any matches. According to at least one embodiment, a match is determined when at least a subset of the keywords derived from the software summary matches an entry in the keyword application knowledge base having the same subset of keywords. If an entry does not match, or if there are additional keywords in the entry that are not included in the set of derived keywords, then the entry is ignored. If one or more entries match, then the primary applications mapped to each of those entries are returned.

The NLP intent derivation model 210 can then process the software summary using one or more NLP intent derivation techniques to derive one or more intents associated with the software summary. In the example above, the intents can be: "change in invoice," "subscription invoice change," and "change in email."

The derived intents and the primary applications can be provided to the intent resolution module 212. The intent resolution module 212, in some embodiments, identifies one or more interlocking applications by determining whether the intent interlock knowledge base includes an entry having one of the primary applications and one or more of the intents. If an entry is found, then the interlocking application that is mapped to that primary application and the one or more intents is labeled as an active interlocking application.

The intent interlock knowledge base can be searched again by the intent resolution module 212 to identify whether any other interlocking application is listed for the active interlocking application. If one or more entries in the intent interlock knowledge base match and the intents derived from the software summary do not match the intents listed for those one or more entries, then the interlocking application is labeled as a passive interlocking application. Also, if an interlocking application is mapped to a passive interlocking application in the interlock application knowledge base, then the interlocking application can be considered a test-only interlocking application by the intent resolution module 212. The intent resolution module 212 can then output the identified interlocking applications 206 to the software summary capturing tool 202.

Generally, an active interlocking application refers to an application that has a high probability of needing to be updated and/or changed as a result of development work associated with the software summary. A passive interlocking application refers to an application that may or may not need to be updated and/or changed as a result of the development work, and a test-only interlock refers to an application that has a low probability of needing to be updated and/or changed, but that likely requires testing as result of the development work. In at least one embodiment, the different types of interlocking applications can correspond to different levels of impacts resulting from the software project.

Accordingly, some embodiments include the intent resolution module 212 applying following logic:
 1. If the primary application and the derived intent(s) are directly mapped in the interlocking application knowledge base, then label the corresponding interlocking application as an active interlocking application;
 2. If an active interlocking application is interlocked with another application in the interlock application knowledge base and the derived intent(s) do not match, then label the other application as a passive interlocking application; and/or 3. If a passive interlocking application is interlocked with another application in the interlock application knowledge base, then it can be labeled as a test-only interlocking application.

In some instances, a passive interlocking application can be updated to an active interlocking application based on user feedback (e.g., a user may specify that a specific application is to be treated as an active interlocking application). In such an example, the interlock application knowledge base can be updated to reflect this change (e.g., by adding an additional intent to the entry corresponding to that application). If the same one or more intents are subsequently derived for that particular application, then the application is treated as an active interlocking application. Similarly, interlocking applications identified as passive interlocking applications can be labeled as test-only interlocking applications. Also, one or more applications that were not identified as interlocking applications can be added as active, passive, or test-only interlocking applications based on user feedback. It is to be appreciated that some embodiments enable passive interlocking applications to be updated to active interlocking applications as the system gathers additional information.

The software summary capturing tool 202, in at least some embodiments, can enable a user to input a given software summary. The user can then select an option (e.g., a button in a user interface) to show possible interlocking applications corresponding to the software summary. In at least one embodiment, contact information can be added to the application knowledge base, which would enable the software summary capturing tool 202 to automatically provide contact information related to the interlocking applications, so that the user can quickly gather additional information, if needed.

In some embodiments, the software summary capturing tool 202 can automatically generate an alert or message based on the contact information. As an example, if an application is identified as an interlocking application, then a message can be sent to one or more developers related to that interlocking application. The message can include a request to provide feedback related to the impact on the interlocking application. For example, the feedback can confirm whether the interlocking application will be impacted or change the impact level that was identified for the interlocking application (e.g., active, passive, test-only). The feedback may alternatively or additionally include updates and/or changes to at least some of the information in the knowledge bases (e.g., keyword application knowledge base 300 and/or intent interlock knowledge base 400). For example, if an application is identified as a test-only interlocking application, and a user provides feedback indicating that the application is an active interlocking application, then this can trigger the intent resolution module 212 to update the identified interlocking applications 206 to reflect any changes.

The application relationship knowledge base 214, in some embodiments, can be updated automatically (without explicit feedback from a user). For example, if an application is initially identified as a test-only interlocking application based on one or more intents, and the software code of the test-only interlocking application is subsequently modified as a result of the development work associated with the software summary, then the application relationship knowledge base 214 can be automatically updated so that the test-only interlocking application is identified as an active-interlocking application the next time a software summary includes the one or more intents. Accordingly, the application relationship knowledge base 214 can continuously improve over time as the software summary capturing tool 202 is used.

Figure 5:
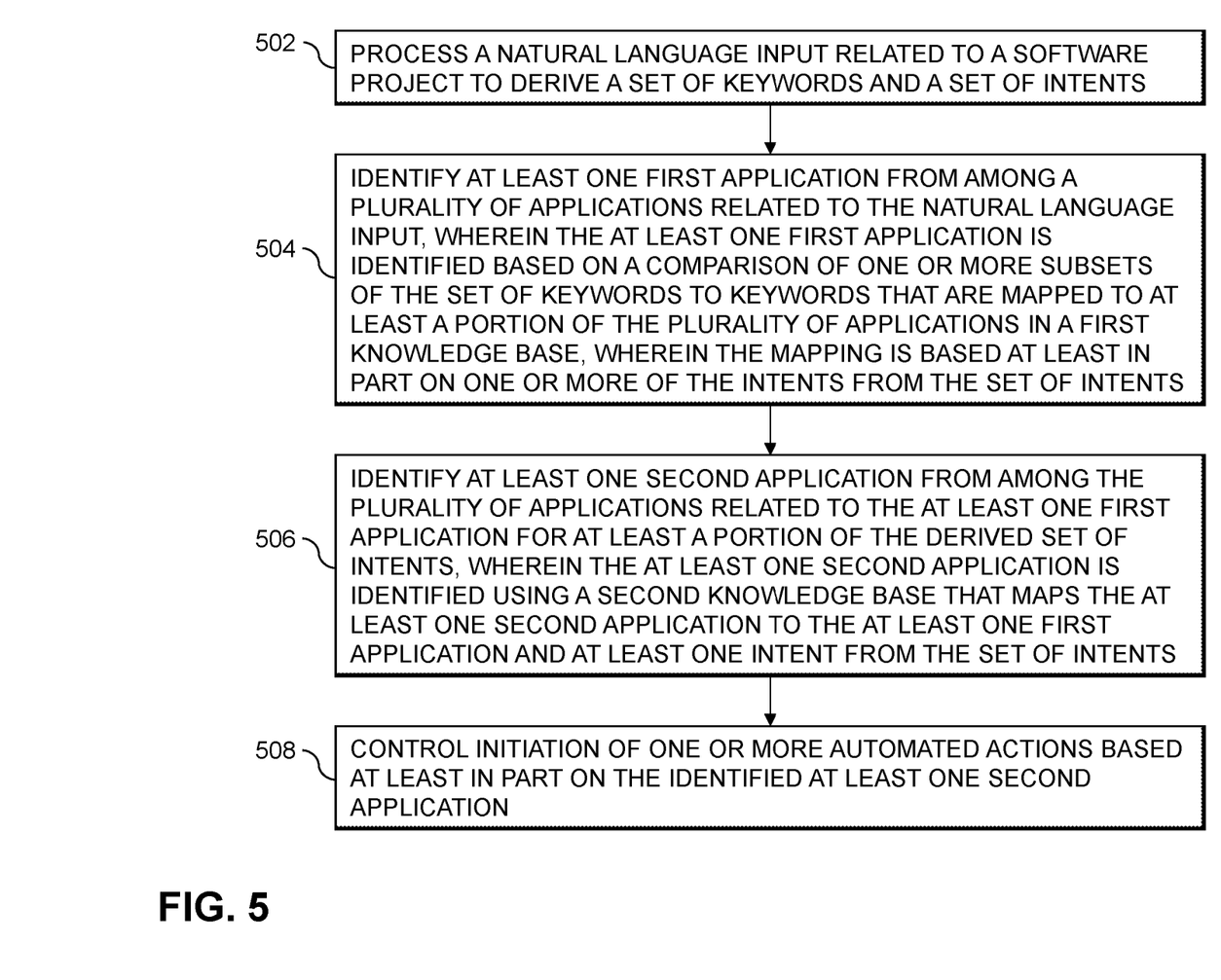
FIG. 5 shows a flow diagram of a process for identifying application relationships using NLP techniques in an illustrative embodiment.

FIG. 5 is a flow diagram of a process for identifying application relationships using NLP techniques in an illustrative embodiment. It is to be understood that this particular process is only an example, and additional or alternative processes can be carried out in other embodiments.

In this embodiment, the process includes steps 502 through 508. These steps are assumed to be performed by the application relationship identification system 105 utilizing its elements 112, 114, 116, and 118.

Step 502 includes processing a natural language input related to a software project to derive a set of keywords and a set of intents.

Step 504 includes identifying at least one first application from among a plurality of applications related to the natural language input, wherein the at least one first application is identified based on a comparison of one or more subsets of the set of keywords to keywords that are mapped to at least a portion of the plurality of applications in a first knowledge base, wherein the mapping is based at least in part on one or more of the intents from the set of intents.

Step 506 includes identify at least one second application from among the plurality of applications related to the at least one first application for at least a portion of the derived set of intents, wherein the at least one second application is identified using a second knowledge base that maps the at least one second application to the at least one first application and at least one intent from the set of intents.

Step 508 includes controlling initiation of one or more automated actions based at least in part on the identified at least one second application.

The set of keywords may be derived by parsing the natural language input to identify a set of words of a particular word type. The one or more intents may be derived using one or more natural language processing models. The process may include the following step: identifying at least one third application from among the plurality of applications related to the at least one second application, wherein the at least one third application is identified based at least in part on the second knowledge base. The process may include the following steps: identifying at least one fourth application from among the plurality of applications related to the at least one third application, wherein the at least one fourth application is identified based at least in part on the second knowledge base; assigning the at least one first application and the at least one second application a first type of label that indicates a first level of impact resulting from the software project; assigning the at least one third application a second type of label that indicates a second level of impact resulting from the software project; assigning the at least one fourth application a third type of label that indicates a third level of impact resulting from the software project. The one or more automated actions may include at least one of: outputting a list of applications that have been assigned labels; outputting information related to one or more developers associated with one or more of: the at least one first application, the at least one second application, the at least one third application, and the at least one fourth application; assigning a ticket to at least of the one or more developers, wherein the ticket indicates at least one of: one or more changes and one or more software tests needed as a result of the software project; and outputting at least one description that describes a relationship between at least two of: the at least one first application, the at least one second application, the at least one third application, and the at least one fourth application. The process may include the following steps: obtaining user feedback in response to at least one of the one or more automated actions; and updating at least one of the first knowledge base and the second knowledge base based on the user feedback. The natural language input may include a description of at least one of: at least one new software feature and at least one change to an existing software feature.

Accordingly, the particular processing operations and other functionality described in conjunction with the flow diagram of FIG. 5 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to significantly improve software development tools by enabling applications affected by development work to be identified by applying NLP techniques to one or more software summaries corresponding to the development work. In some embodiments, one or more automated actions can be performed related to updating and/or testing the impacted applications, for example. These and other embodiments, for example, can effectively improve the speed at which the software project can be developed and tested relative to conventional approaches.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
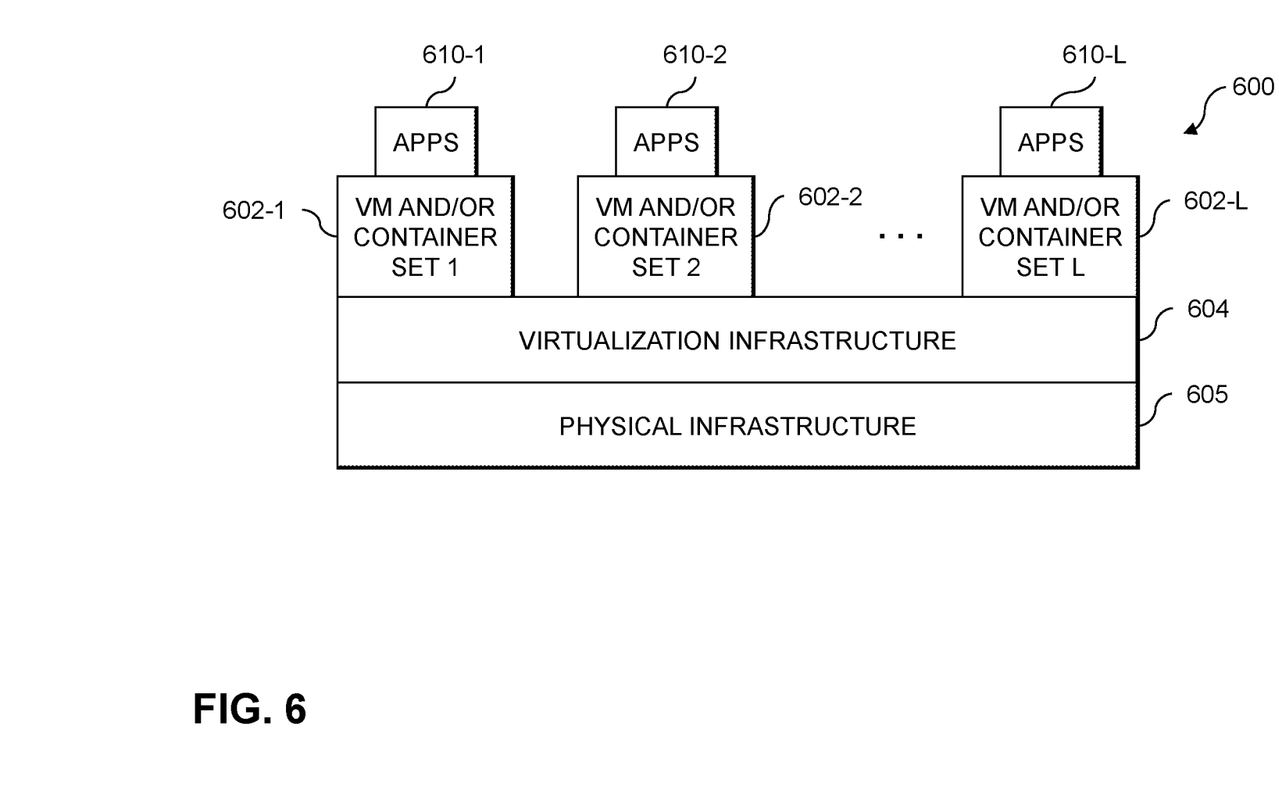
FIGS. 6 and 7 show examples of processing platforms that may be utilized to implement at least a portion of an information processing system in illustrative embodiments.
Figure 7:
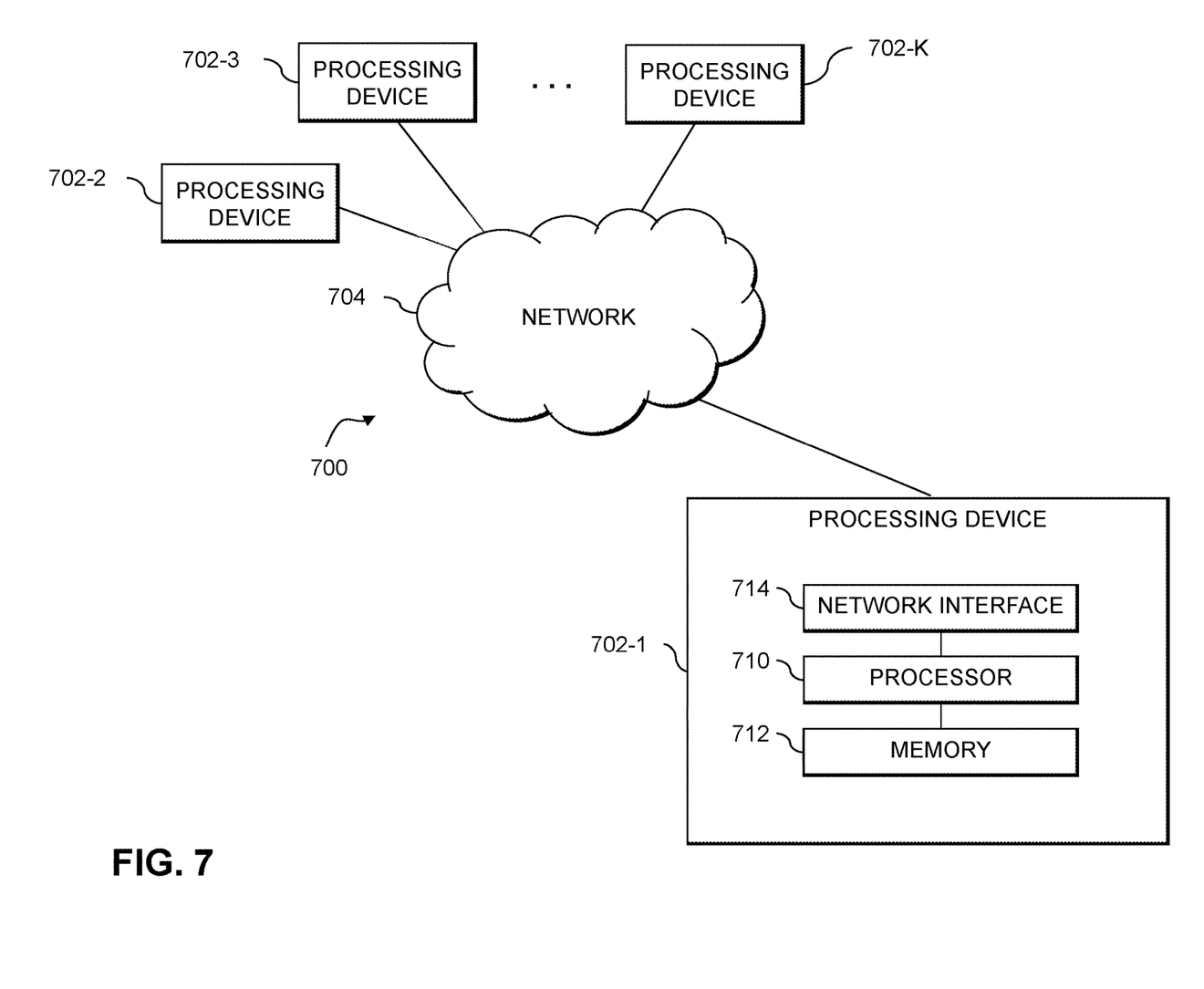

FIG. 6 shows an example processing platform comprising cloud infrastructure 600. The cloud infrastructure 600 comprises a combination of physical and virtual processing resources that are utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 comprise respective VMs, respective sets of one or more containers, or respective sets of one or more containers running in VMs. In some implementations of the FIG. 6 embodiment, the VMs/container sets 602 comprise respective VMs implemented using virtualization infrastructure 604 that comprises at least one hypervisor.

A hypervisor platform may be used to implement a hypervisor within the virtualization infrastructure 604, wherein the hypervisor platform has an associated virtual infrastructure management system. The underlying physical machines comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 702-1 in the processing platform 700 comprises a processor 710 coupled to a memory 712.

The processor 710 comprises a microprocessor, a microcontroller, an ASIC, an FPGA or other type of processing circuitry, as well as portions or combinations of such circuitry elements.

The memory 712 comprises RAM, ROM or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
processing a natural language input related to a software project to derive a set of keywords and a set of intents, wherein the processing comprises processing numerical representations of at least a portion of the natural language input using one or more natural language processing models to derive the set of intents;
identifying at least one first application from among a plurality of applications related to the natural language input, wherein the at least one first application is identified based on a comparison of one or more subsets of the set of keywords to keywords that are mapped to at least a portion of the plurality of applications in a first knowledge base, wherein the mapping is based at least in part on one or more of the intents from the set of intents;
identifying at least one second application from among the plurality of applications related to the at least one first application for at least a portion of the derived set of intents, wherein the at least one second application is identified using a second knowledge base that maps the at least one second application to the at least one first application and at least one intent from the set of intents; and controlling initiation of one or more automated actions based at least in part on the identified at least one second application;

wherein the method is performed by at least one processing device comprising a processor coupled to a memory.

2. The computer-implemented method of claim 1, wherein the set of keywords is derived by parsing the natural language input to identify a set of words of a particular word type.

3. The computer-implemented method of claim 1, wherein the one or more intents are derived using one or more natural language processing models.

4. The computer-implemented method of claim 1, further comprising:

identifying at least one third application from among the plurality of applications related to the at least one second application, wherein the at least one third application is identified based at least in part on the second knowledge base.

5. The computer-implemented method of claim 4, further comprising: identifying at least one fourth application from among the plurality of applications related to the at least one third application, wherein the at least one fourth application is identified based at least in part on the second knowledge base;

assigning the at least one first application and the at least one second application a first type of label that indicates a first level of impact resulting from the software project;

assigning the at least one third application a second type of label that indicates a second level of impact resulting from the software project; and assigning the at least one fourth application a third type of label that indicates a third level of impact resulting from the software project.

6. The computer-implemented method of claim 5, wherein the one or more automated actions comprise at least one of:

outputting a list of applications that have been assigned labels;

outputting information related to one or more developers associated with one or more of: the at least one first application, the at least one second application, the at least one third application, and the at least one fourth application;

assigning a ticket to at least one of the one or more developers, wherein the ticket indicates at least one of: one or more changes and one or more software tests needed as a result of the software project; and outputting at least one description that describes a relationship between at least two of: the at least one first application, the at least one second application, the at least one third application, and the at least one fourth application.

7. The computer-implemented method of claim 1, further comprising:

obtaining user feedback in response to at least one of the one or more automated actions; and updating at least one of the first knowledge base and the second knowledge base based on the user feedback.

8. The computer-implemented method of claim 1, wherein the natural language input comprises a description of at least one of: at least one new software feature and at least one change to an existing software feature.

9. A non-transitory processor-readable storage medium having stored therein program code of one or more software programs, wherein the program code when executed by at least one processing device causes the at least one processing device:

to process a natural language input related to a software project to derive a set of keywords and a set of intents, wherein the processing comprises processing numerical representations of at least a portion of the natural language input using one or more natural language processing models to derive the set of intents;

to identify at least one first application from among a plurality of applications related to the natural language input, wherein the at least one first application is identified based on a comparison of one or more subsets of the set of keywords to keywords that are mapped to at least a portion of the plurality of applications in a first knowledge base, wherein the mapping is based at least in part on one or more of the intents from the set of intents;

to identify at least one second application from among the plurality of applications related to the at least one first application for at least a portion of the derived set of intents, wherein the at least one second application is identified using a second knowledge base that maps the at least one second application to the at least one first application and at least one intent from the set of intents; and to control initiation of one or more automated actions based at least in part on the identified at least one second application.

10. The non-transitory processor-readable storage medium of claim 9, wherein the set of keywords is derived by parsing the natural language input to identify a set of words of a particular word type.

11. The non-transitory processor-readable storage medium of claim 9, wherein the one or more intents are derived using one or more natural language processing models.

12. The non-transitory processor-readable storage medium of claim 9, wherein the program code causes the at least one processing device further:

to identify at least one third application from among the plurality of applications related to the at least one second application, wherein the at least one third application is identified based at least in part on the second knowledge base.

13. The non-transitory processor-readable storage medium of claim 12, wherein the program code further causes the at least one processing device:

to identify at least one fourth application from among the plurality of applications related to the at least one third application, wherein the at least one fourth application is identified based at least in part on the second knowledge base;

to assign the at least one first application and the at least one second application a first type of label that indicates a first level of impact resulting from the software project;

to assign the at least one third application a second type of label that indicates a second level of impact resulting from the software project; and to assign the at least one fourth application a third type of label that indicates a third level of impact resulting from the software project.

14. The non-transitory processor-readable storage medium of claim 9, wherein the program code causes the at least one processing device further:
- to obtain user feedback in response to at least one of the one or more automated actions; and
- to update at least one of the first knowledge base and the second knowledge base based on the user feedback.

15. An apparatus comprising:
- at least one processing device comprising a processor coupled to a memory;
- the at least one processing device being configured:
- to process a natural language input related to a software project to derive a set of keywords and a set of intents, wherein the processing comprises processing numerical representations of at least a portion of the natural language input using one or more natural language processing models to derive the set of intents;
- to identify at least one first application from among a plurality of applications related to the natural language input, wherein the at least one first application is identified based on a comparison of one or more subsets of the set of keywords to keywords that are mapped to at least a portion of the plurality of applications in a first knowledge base, wherein the mapping is based at least in part on one or more of the intents from the set of intents;
- to identify at least one second application from among the plurality of applications related to the at least one first application for at least a portion of the derived set of intents, wherein the at least one second application is identified using a second knowledge base that maps the at least one second application to the at least one first application and at least one intent from the set of intents; and
- to control an initiation of one or more automated actions based at least in part on the identified at least one second application.

16. The apparatus of claim 15, wherein the set of keywords is derived by parsing the natural language input to identify a set of words of a particular word type.

17. The apparatus of claim 15, wherein the one or more intents are derived using one or more natural language processing models.

18. The apparatus of claim 15, wherein the at least one processing device is further configured:
- to identify at least one third application from among the plurality of applications related to the at least one second application, wherein the at least one third application is identified based at least in part on the second knowledge base.

19. The apparatus of claim 18, wherein the at least one processing device is further configured:
- to identify at least one fourth application from among the plurality of applications related to the at least one third application, wherein the at least one fourth application is identified based at least in part on the second knowledge base;
- to assign the at least one first application and the at least one second application a first type of label that indicates a first level of impact resulting from the software project;
- to assign the at least one third application a second type of label that indicates a second level of impact resulting from the software project; and
- to assign the at least one fourth application a third type of label that indicates a third level of impact resulting from the software project.

20. The apparatus of claim 15, wherein the at least one processing device is further configured:
- to obtain user feedback in response to at least one of the one or more automated actions; and
- to update at least one of the first knowledge base and the second knowledge base based on the user feedback.

* * * * *